(12) United States Patent
Fukuda et al.

(10) Patent No.: US 7,296,234 B2
(45) Date of Patent: Nov. 13, 2007

(54) ELECTRONIC DEVICE

(75) Inventors: Tetsu Fukuda, Kanagawa (JP);
Yoshikazu Shibamiya, Kanagawa (JP);
Katsuhiro Miyamoto, Kanagawa (JP);
Takashi Yamamoto, Kanagawa (JP);
Yuichi Matsumoto, Kanagawa (JP);
Shuntaro Aratani, Tokyo (JP); Masaki Kutsuna, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 09/962,129

(22) Filed: Sep. 26, 2001

(65) Prior Publication Data

US 2002/0054154 A1 May 9, 2002

(30) Foreign Application Priority Data

Sep. 29, 2000 (JP) ............................. 2000-301092

(51) Int. Cl.
*G06F 3/00* (2006.01)
(52) U.S. Cl. ..................................................... 715/744
(58) Field of Classification Search ........ 345/716–718, 345/734, 744, 760, 764, 765, 771, 810, 825, 345/835–836, 846, 853–855; 715/716, 717, 715/718, 734, 735, 744, 760
See application file for complete search history.

(56) References Cited

U.S. PATENT DOCUMENTS

| | | | |
|---|---|---|---|
| 5,032,975 A | 7/1991 | Yamamoto et al. ......... 364/134 |
| 5,136,222 A | 8/1992 | Yamamoto et al. ....... 318/568.2 |
| 5,646,608 A * | 7/1997 | Shintani ................ 340/825.52 |
| 6,078,663 A | 6/2000 | Yamamoto ..................... 380/9 |
| 6,288,716 B1 * | 9/2001 | Humpleman et al. ....... 715/733 |
| 6,446,080 B1 * | 9/2002 | Van Ryzin et al. ...... 707/104.1 |
| 6,532,005 B1 * | 3/2003 | Campbell ................... 345/173 |
| 6,570,507 B1 * | 5/2003 | Lee et al. ............. 340/825.22 |
| 6,952,799 B2 * | 10/2005 | Edwards et al. ......... 715/501.1 |
| RE39,059 E * | 4/2006 | Foster ........................ 715/744 |

OTHER PUBLICATIONS

U.S. Appl. No. 09/344,509, filed Jun. 25, 1999.
U.S. Appl. No. 09/531,959, filed Mar. 21, 2000.
U.S. Appl. No. 09/725,815, filed Nov. 30, 2000.
U.S. Appl. No. 09/921,569, filed Aug. 6, 2001.

* cited by examiner

*Primary Examiner*—Kristine Kincaid
*Assistant Examiner*—Thanh Vu
(74) *Attorney, Agent, or Firm*—Fitzpatrick, Cella, Harper & Scinto

(57) ABSTRACT

An electronic device includes a design changing unit, a communication unit and a light emitting unit. The design changing unit changes a color of the background of a control panel to a color selected by a user. The control panel is stored in the electronic device, to be displayed by a controller and to be used to control the electronic device. The communication unit transmits the control panel changed by the design changing unit from the electronic device to the controller so that the electronic device is remotely controllable using the control panel changed by the design changing unit. The light emitting unit emits light of a color the same as a background color of the control panel displayed by the controller and selected by a user.

16 Claims, 2 Drawing Sheets

ELECTRONIC DEVICE

BACKGROUND OF THE INVENTION

1. Field of the Invention

The present invention relates to a remote control system for remote controlling plural electronic devices on a network system.

2. Background Related Art

For remote controlling the plural electronic devices on a network system, there have been proposed various systems. In the network system based on the IEEE1394-1995 standard, there is being proposed a system capable, by merely operating a control panel displayed on a controller (control device), of remote controlling various functions of a target (controlled device) corresponding to such control panel.

However such system has been associated with the following drawbacks.

In case plural targets are of a same manufacturer, a same type and a same version, the control panels of such targets usually have an identical design. When the control panel of such target is displayed on the controller, the user may become unable to recognize the correspondence between the control panel and the target unless the user pays sufficient attention. Also unless the correspondence between the control panel and the target is always kept in mind, the user may erroneously operate the control panel of a target different from the desired target. Furthermore, in order to confirm the correspondence between the control panel and the target, it is necessary to actually operate each control panel thereby specifying the actually functioning target.

SUMMARY OF THE INVENTION

An object of the present invention is to solve the above-described drawbacks.

Another object of the present invention is to achieve simple identification of the control panels of plural targets, thereby preventing erroneous operation of the user.

The above-mentioned objects can be attained, according to a preferred embodiment of the present invention, by an electronic device which is remote controlled according to a control panel displayed on a controller, comprising:
a memory storing said control panel; and
changing means for changing the design of said control panel.

Still other objects of the present invention, and the features thereof, will become fully apparent from the following detailed description of the embodiments, to be taken in conjunction with the appended drawings.

DETAILED DESCRIPTION OF THE PREFERRED EMBODIMENTS

In the following the present invention will be explained by a preferred embodiment, with reference to the accompanying drawings.

Figure 1:
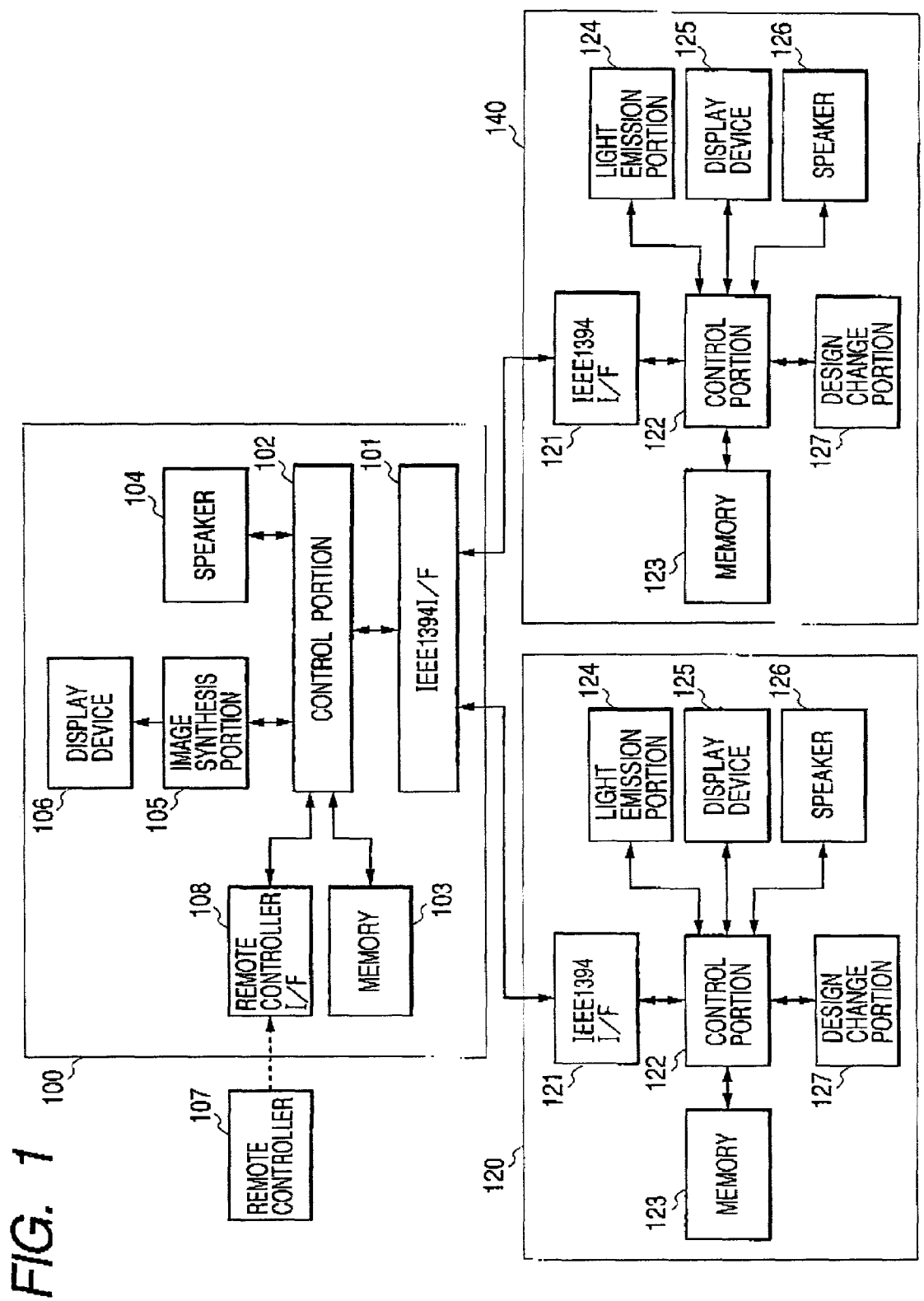
FIG. 1 is a block diagram showing an example of the configuration of a remote control system embodying the present invention.

At first reference is made to FIG. 1 for explaining a remote control system embodying the present invention.

Referring to FIG. 1, there are shown a display device 100 functioning as a controller (control device); a digital video recorder (digital cassette recorder or VCR) 120 functioning as a target (controlled device), and a digital video recorder (VCR) 140 functioning as a target (controlled device) similarly to the target 120. The manufacturer, device type and version of the target 140 are same as those of the target 120.

The target 120 is provided with a control panel, constituting the graphical user interface for remote controlling the various functions of the target 120. Similarly the target 140 is provided with a control panel, constituting the graphical user interface for remote controlling the various functions of the target 140. Since the manufacturer, device type and version of the target 120 are same as those of the target 140, the default design of the control panel provided in the target 120 is same as that of the control panel provided in the target 140.

Figure 2:
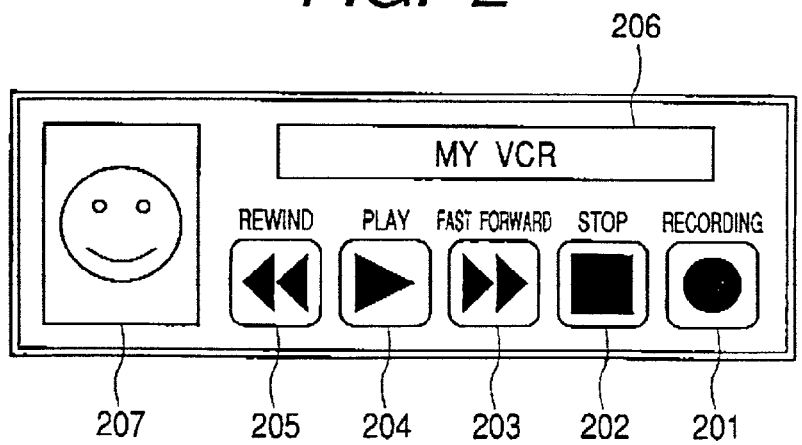
FIG. 2 is a view showing a default design of a control panel provided in targets 120 and 140.

FIG. 2 shows the default design of the control panel provided in the targets 120 and 140.

Referring to FIG. 2, there are shown a button element 201 correlated with the recording function of the digital video recorder, a button element 202 correlated with the stopping function of the digital video recorder, a button element 203 correlated with the fast forward function of the digital video recorder, a button element 204 correlated with the playing function of the digital video recorder, a button element 205 correlated with the rewinding function of the digital video recorder, a text element 206 for displaying a character train selected by the user, and an icon element 207 for displaying an icon selected by the user.

The user can remote control the target 120 by operating the control panel of the target 120, and can remote control the target 140 by operating the control panel of the target 140.

In the following there will be explained the principal configuration of the controller 100 with reference to FIG. 1.

Referring to FIG. 1, there is provided a digital interface 101 based on the IEEE1394-1995 standard and the IEEE1394a-2000 standard (hereinafter called IEEE1394 interface). The IEEE1394 interface 101 receives the control panels transmitted from the targets 120 and 140. There are also provided a control portion 102, a memory 103 for storing the control panel of the target 120 and that of the target 140, a speaker 104, an image synthesis portion 105 for synthesizing the control panels of the targets 120, 140 in the image data of each image frame, a display device 106 such as a CRT, a liquid crystal panel or a plasma display panel, a remote controller 107 for remote controlling the control panel of the target 120 and that of the target 140 displayed on the display device 106, and a remote control interface 108 for receiving a control signal transmitted by infrared communication or wireless communication from the remote controller 107.

Now reference is made again to FIG. 1 for explaining the principal configuration of the targets 120 and 140. Since the target 120 is same in the manufacturer, device type and version as the target 140, the principal configuration of the target 120 is same as that of the target 140.

Referring to FIG. 1, there is provided a digital interface 121 based on the IEEE1394-1995 standard and the IEEE1394a-2000 standard (hereinafter called IEEE1394 interface). The IEEE1394 interface 121 transmits the control panel to the controller 100. There are also provided a control portion 122, a memory 123 for storing the control panel of the target 120 or that of the target 140, a light emitting portion 124 for emitting light of a color same as that of the background of the control panel, a display device 125 for displaying a character train same as that displayed in the text element 206 of the control panel and an icon same as that displayed in the icon element 207 of the control panel, a speaker 126 for emitting sound same as that outputted from the controller 100 when the control panel is focused, and a design change portion 127 for changing the design of the control panel according to the instruction of the user.

In case of changing the color of the background of the control panel, the user operates the design changing portion 127 and selects a desired color from the plural colors (for example red, green, blue, yellow, pale blue, pink, violet and orange). The control portion 122 changes the color of the background of the control panel to the color selected by the user. By selecting different colors for the backgrounds of the control panels of the targets 140 and 120, the control panel of the target 140 can be easily identified from that of the target 120 and the erroneous operation can be prevented.

Also in case of changing the character train displayed in the text element 206 of the control panel, the user operates the design changing portion 127 to select desired one from plural character trains (for example "my VCR", "daddy's VCR", "mammy's VCR" etc.). The control portion 122 changes the character train displayed in the text element 206 of the control panel to the character train selected by the user. By selecting different character trains for the control panels of the targets 140 and 120, the control panel of the target 140 can be easily identified from that of the target 120 and the erroneous operation can be prevented.

Also in case of changing the icon displayed in the icon element 207 of the control panel, the user operates the design changing portion 127 to select desired one from plural icons. The control portion 122 changes the icon displayed in the icon element 207 of the control panel to the icon selected by the user. By selecting different icons for the control panels of the targets 140 and 120, the control panel of the target 140 can be easily identified from that of the target 120 and the erroneous operation can be prevented.

Also in case of changing the sound emitted from the speaker 104 when the control panel is focused, the user operates the design changing portion 127 to select desired one from plural sounds. The control portion 122 changes the sound of the control panel to the sound selected by the user. By selecting different sounds for the control panels of the targets 140 and 120, the control panel of the target 140 can be easily identified from that of the target 120 and the erroneous operation can be prevented.

In the following there will be explained, with reference to FIG. 3, a method for easily identifying the correspondence between the control panel and the target.

Figure 3:
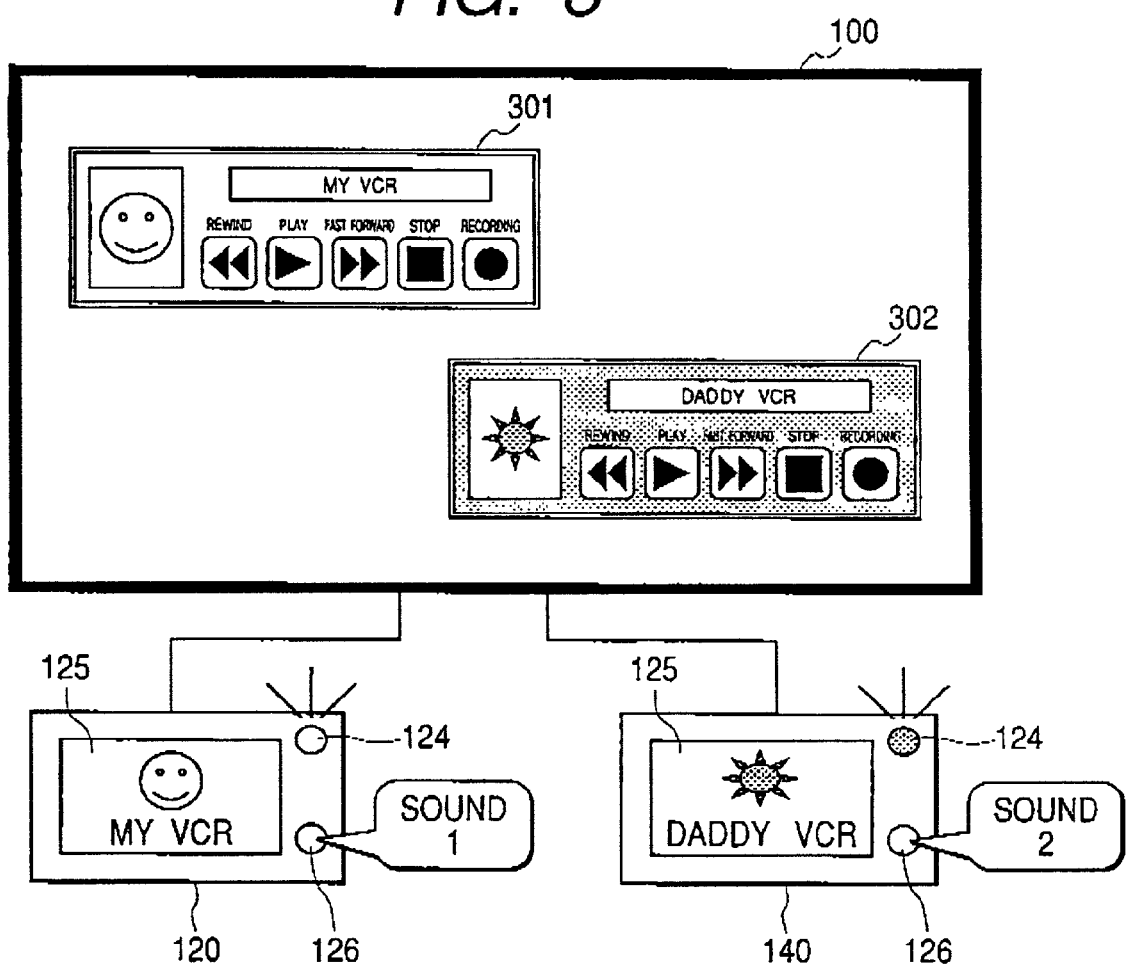
FIG. 3 is a view showing a method of simply identifying the correspondence between the control panel and the target.

In FIG. 3, there are shown a control panel 301 provided by the target 120, and a control panel 302 provided by the target 140. As shown in FIG. 3, the color of the background of the control panel 301 is selected different from that of the background of the control panel 302. Also the text displayed in the text element 206 of the control panel 301 is selected different from that of the control panel 302. Further, the icon displayed in the icon element 207 of the control panel 301 is selected different from that of the control panel 302. Further, the sound of the control panel 301 ("sound 1") is selected different from that of the control panel 302 ("sound 2").

When the control panel 301 of the target 120 is focused (namely when the control panel 301 is selected by the remote controller 107), the light emitting portion 124 emits light of a color same as that of the background of the control panel. Also in such case, the display device 125 displays a character train same as that displayed in the text element 206 of the control panel, and also displays an icon same as that displayed in the icon element 207 of the control panel. Also in such case, the speaker 126 emits a sound same as that emitted from the speaker 104 of the controller 100. Thus the user can easily identify the correspondence between the control panel 301 and the target 120.

When the control panel 302 of the target 140 is focused (namely when the control panel 302 is selected by the remote controller 107), the light emitting portion 124 emits light of a color same as that of the background of the control panel. Also in such case, the display device 125 displays a character train same as that displayed in the text element 206 of the control panel, and also displays an icon same as that displayed in the icon element 207 of the control panel. Also in such case, the speaker 126 emits a sound same as that emitted from the speaker 104 of the controller 100. Thus the user can easily identify the correspondence between the control panel 302 and the target 140.

As explained in the foregoing, the present embodiment allows to change the background color of the control panel, thereby enabling to simply identify the control panels of the plural targets and to prevent erroneous operation.

Also the present embodiment allows to change the character train displayed in the control panel, thereby enabling to simply identify the control panels of the plural targets and to prevent erroneous operation.

Also the present embodiment allows to change the icon displayed in the control panel, thereby enabling to simply identify the control panels of the plural targets and to prevent erroneous operation Also the present embodiment allows to change the sound emitted from the speaker of the controller when the control panel is focused, thereby enabling to simply identify the control panels of the plural targets and to prevent erroneous operation.

Also the present embodiment allows to select the control panel of the desired target without confusion, thereby improving the operability.

Also the present embodiment allows to easily identify the correspondence between the control panel and the target.

The present invention may be embodied in other specific forms without departing from essential characteristics thereof.

Therefore, the above-described embodiments are merely exemplary of the invention, and are not be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. An electronic device comprising:
a design changing unit which changes a color of the background of a control panel to a color selected by a user, wherein the control panel is stored in said electronic device, to be displayed by a controller and to be used to control said electronic device;
a communication unit which transmits the control panel changed by said design changing unit from said electronic device to the controller so that said electronic device is remotely controllable using the control panel changed by said design changing unit; and a light emitting unit which emits light of a color the same as a background color of the control panel displayed by the controller and selected by a user.

2. An electronic device according to claim 1, further comprising a display unit which displays a string of characters the same as that included in the control panel displayed by the controller and selected by a user.

3. An electronic device according to claim 1, further comprising a display unit which displays an icon the same as that included in the control panel displayed by the controller and selected by a user.

4. An electronic device according to claim 1, further comprising a speaker which outputs a sound the same as that outputted from the controller, if the control panel displayed by the controller is selected by a user.

5. An electronic device according to claim 1, wherein said design changing unit changes a string of characters included in the control panel to a string of characters selected by a user.

6. An electronic device according to claim 1, wherein said design changing unit changes an icon included in the control panel to an icon selected by a user.

7. An electronic device according to claim 1, wherein said communication unit is conformed to IEEE 1394-1995 standard or IEEE 1394a-2000 standard.

8. An electronic device according to claim 1, further comprising a reception unit which receives control signals from the controller and which controls the electronic device based on the control signals.

9. A method of controlling an electronic device, said method comprising the steps of:
   changing a background color of a control panel to a color selected by a user, wherein the control panel is stored in the electronic device, to be displayed by a controller and to be used to control the electronic device;
   transmitting the control panel changed in said background color changing step from the electronic device to the controller so that the electronic device is remotely controllable using the control panel changed in said background color changing step; and
   emitting light from the electronic device, wherein the emitted light is of a color the same as a background color of the control panel displayed by the controller and selected by a user.

10. A method according to claim 9, further comprising the step of:
    displaying a string of characters the same as that included in the control panel displayed by the controller and selected by a user.

11. A method according to claim 9, further comprising the step of:
    displaying an icon the same as that included in the control panel displayed by the controller and selected by a user.

12. A method according to claim 9, further comprising the step of:
    outputting a sound the same as that outputted from the controller, if the control panel displayed by the controller is selected by a user.

13. A method according to claim 9, further comprising the step of:
    changing a string of characters included in the control panel to a string of characters selected by a user.

14. A method according to claim 9, further comprising the step of:
    changing an icon included in the control panel to an icon selected by a user.

15. A method according to claim 9, wherein the control panel is transmitted from the electronic device to the controller using a communication unit conformed to IEEE 1394-1995 standard or IEEE 1394a-2000 standard.

16. A method according to claim 9, further comprising the step of:
    receiving control signals from the controller and controlling the electronic device based on the control signals.

* * * * *